United States Patent
Milton et al.

(10) Patent No.: US 11,270,324 B2
(45) Date of Patent: *Mar. 8, 2022

(54) LOCATION-BASED ANALYTIC PLATFORM AND METHODS

(71) Applicant: PlaceIQ, Inc., New York, NY (US)

(72) Inventors: Stephen Milton, New York, NY (US); Duncan McCall, New York, NY (US)

(73) Assignee: PLACEIQ, INC., New York, NY (US)

( * ) Notice: Subject to any disclaimer, the term of this patent is extended or adjusted under 35 U.S.C. 154(b) by 264 days.

This patent is subject to a terminal disclaimer.

(21) Appl. No.: 16/289,552

(22) Filed: Feb. 28, 2019

(65) Prior Publication Data

US 2019/0197570 A1 Jun. 27, 2019

Related U.S. Application Data

(63) Continuation of application No. 14/667,371, filed on Mar. 24, 2015, now Pat. No. 10,262,330, which is a continuation-in-part of application No. 14/553,422, filed on Nov. 25, 2014, now abandoned, and a continuation-in-part of application No. 14/334,066, filed on Jul. 17, 2014, now Pat. No. 9,589,280, and a continuation-in-part of application No. 13/938,974, filed on Jul. 10, 2013, now abandoned, and a continuation-in-part of application No. 13/918,576, filed on Jun. 14, 2013, now Pat. No. 9,275,114, and a continuation-in-part of application No. 13/769,736, (Continued)

(51) Int. Cl.
*G06Q 30/02* (2012.01)
*H04W 4/029* (2018.01)
*G06F 16/9537* (2019.01)

(52) U.S. Cl.
CPC ..... *G06Q 30/0205* (2013.01); *G06F 16/9537* (2019.01); *G06Q 30/02* (2013.01); *H04W 4/029* (2018.02)

(58) Field of Classification Search
None
See application file for complete search history.

(56) References Cited

U.S. PATENT DOCUMENTS

2008/0183705 A1* 7/2008 Shivaji-Rao ....... H04N 21/4665
2013/0204972 A1* 8/2013 Russell ................... H04L 45/44
709/217

\* cited by examiner

*Primary Examiner* — Amresh Singh
(74) *Attorney, Agent, or Firm* — Pillsbury Winthrop Shaw Pittman LLP

(57) ABSTRACT

Provided is a process of learning an audience member function, the process including: obtaining a training set of geographic data describing geolocation histories of a plurality of mobile devices, wherein members of the training set are classified according to whether the respective member of the training set is a member of an audience; retrieving attributes of geolocations in the geolocation histories from a geographic information system; learning feature functions of an audience member function based on the training set, wherein at least some of the feature functions are a function of the retrieved attributes of geolocation, wherein the feature functions are learned, at least in part, by calculating a plurality of impurity measures for candidate feature functions and selecting one of the candidate feature functions based on the relative values of the impurity measures; and storing the feature functions of the audience member function in an audience repository.

20 Claims, 4 Drawing Sheets

Related U.S. Application Data filed on Feb. 18, 2013, now abandoned, said application No. 13/918,576 is a continuation of application No. 13/734,674, filed on Jan. 4, 2013, now Pat. No. 8,489,596.

(60) Provisional application No. 62/066,100, filed on Oct. 20, 2014, provisional application No. 62/026,128, filed on Jul. 18, 2014, provisional application No. 61/969,661, filed on Mar. 24, 2014, provisional application No. 61/908,560, filed on Nov. 25, 2013, provisional application No. 61/847,083, filed on Jul. 17, 2013.

LOCATION-BASED ANALYTIC PLATFORM AND METHODS

CROSS-REFERENCE TO RELATED APPLICATIONS

The present application is a continuation of U.S. patent application Ser. No. 14/667,371, titled "LOCATION-BASED ANALYTIC PLATFORM AND METHODS," filed 24 Mar. 2015, which claims the benefit of U.S. Provisional Patent Application 61/969,661, titled "LOCATION-BASED ANALYTIC PLATFORM AND METHODS," filed 24 Mar. 2014; U.S. patent application Ser. No. 14/667,371 is a continuation-in-part of U.S. patent application Ser. No. 13/918,576, titled "Apparatus and Method for Profiling Users," filed 14 Jun. 2013, which is a continuation of U.S. Pat. No. 8,489,596, titled "Apparatus and Method for Profiling Users," filed 04 Jan. 2013; U.S. patent application Ser. No. 14/667,371 is a continuation-in-part of U.S. patent application Ser. No. 13/769,736, titled "Apparatus and Method for Identifying and Employing Visitation Rates," filed 18 Feb. 2013; U.S. patent application Ser. No. 14/667,371 is a continuation-in-part of U.S. patent application Ser. No. 13/938,974, titled "PROJECTING LOWER-GEOGRAPHIC-RESOLUTION DATA ONTO HIGHER- GEOGRAPHIC-RESOLUTION AREAS," filed 10 Jul. 2013; U.S. patent application Ser. No. 14/667,371 is a continuation-in-part of U.S. patent application Ser. No. 14/334,066, titled "Matching Anonymized User Identifiers Across Differently Anonymized Data Sets," filed 17 Jul. 2014, which claims the benefit of U.S. Provisional Patent Application 61/847,083, titled "Matching Anonymized User Identifiers Across Differently Anonymized Data Sets," filed 17 Jul. 2013; U.S. patent application Ser. No. 14/667,371 is a continuation-in-part of U.S. patent application Ser. No. 14/553,422, titled "Apparatus and Method for Determining the Quality or Accuracy of Reported Locations," filed 25 Nov. 2014, which claims the benefit of U.S. Patent Application 61/908,560, titled "APPARATUS AND METHOD FOR DETERMINING THE QUALITY OR ACCURACY OF REPORTED LOCATIONS," filed 25 Nov. 2013; U.S. patent application Ser. No. 14/667,371 claims the benefit of U.S. Provisional Patent Application 62/026,128, titled "Analyzing Mobile-Device Location Histories To Characterize Consumer Behavior," filed 18 Jul. 2014; and U.S. patent application Ser. No. 14/667,371 claims the benefit of U.S. Provisional Patent Application 62/066,100, titled "Scripting Distributed, Parallel Programs," filed 20 Oct. 2014. Each listed parent application is hereby incorporated by reference in its entirety.

BACKGROUND

1. Field

The present invention relates generally to geolocation data and, more specifically, to techniques for identifying relatively homogenous populations based on patterns in attributes of geolocations visited by population members.

2. Description of the Related Art

Geolocation analytics platforms are generally used to understand human behavior. Such systems map data about places to geographic locations and then this mapping is used to analyze patterns in human behavior based on people's presence in those geographic locations. For example, researchers may use such systems to understand patterns in health, educational, crime, or political outcomes in geographic areas. And some companies use such systems to understand the nature of their physical locations, analyzing, for instance, the demographics of customers who visit their stores, restaurants, or other facilities. Some companies use such systems to measure and understand the results of TV advertising campaigns, detecting changes in the types of customers who visit stores following a campaign. Some companies use geolocation analytics platforms to target content to geolocations, e.g., selecting content like business listings, advertisements, billboards, mailings, restaurant reviews, and the like, based on human behavior associated with locations to which the content is directed. In many contexts, location can be a useful indicator of human behavior.

In some cases, people are classified as being members of various audiences, or relatively homogenous populations in terms of expected behavior (e.g., propensity to attain an educational outcome, respond favorably to content, visit a store, etc.). One criteria for identifying audiences is a person's current geographic location. Often the location of people is indicative of various likely behaviors. The designation of audiences can be helpful in a variety of contexts. In the political sphere, swing voters constitute a type of audience. Or in the realm of education services, at-risk students can constitute another type of audience. Government services and commercial real-estate site selection may also be influenced by behaviors of audiences, e.g., a decision to position a restaurant franchise near a place members of an audience frequent during lunch hours.

Many existing systems define audiences with insufficient specificity. In some cases, a user's current location is relatively poorly correlated with behavior. Tourists in New York would likely not be interested in reviews of local plumbers, for example. Yet discovering more precise descriptors of audiences can be difficult. Often data about users is relatively high-dimensioned, including, for instance, location history, purchasing behavior, social network behavior, and the like. Selecting and properly balancing among values in these various dimensions can be difficult, so those evaluating such data often disregard meaningful information in records about people.

SUMMARY

The following is a non-exhaustive listing of some aspects of the present techniques. These and other aspects are described in the following disclosure.

Some aspects include a process of learning an audience member function, the process including: obtaining a training set of geographic data describing geolocation histories of a plurality of mobile devices, wherein members of the training set are classified according to whether the respective member of the training set is a member of an audience; retrieving attributes of geolocations in the geolocation histories from a geographic information system; learning feature functions of an audience member function based on the training set, wherein at least some of the feature functions are a function of the retrieved attributes of geolocation, wherein the feature functions are learned, at least in part, by calculating a plurality of impurity measures for candidate feature functions and selecting one of the candidate feature functions based on the relative values of the impurity measures; and storing the feature functions of the audience member function in an audience repository.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
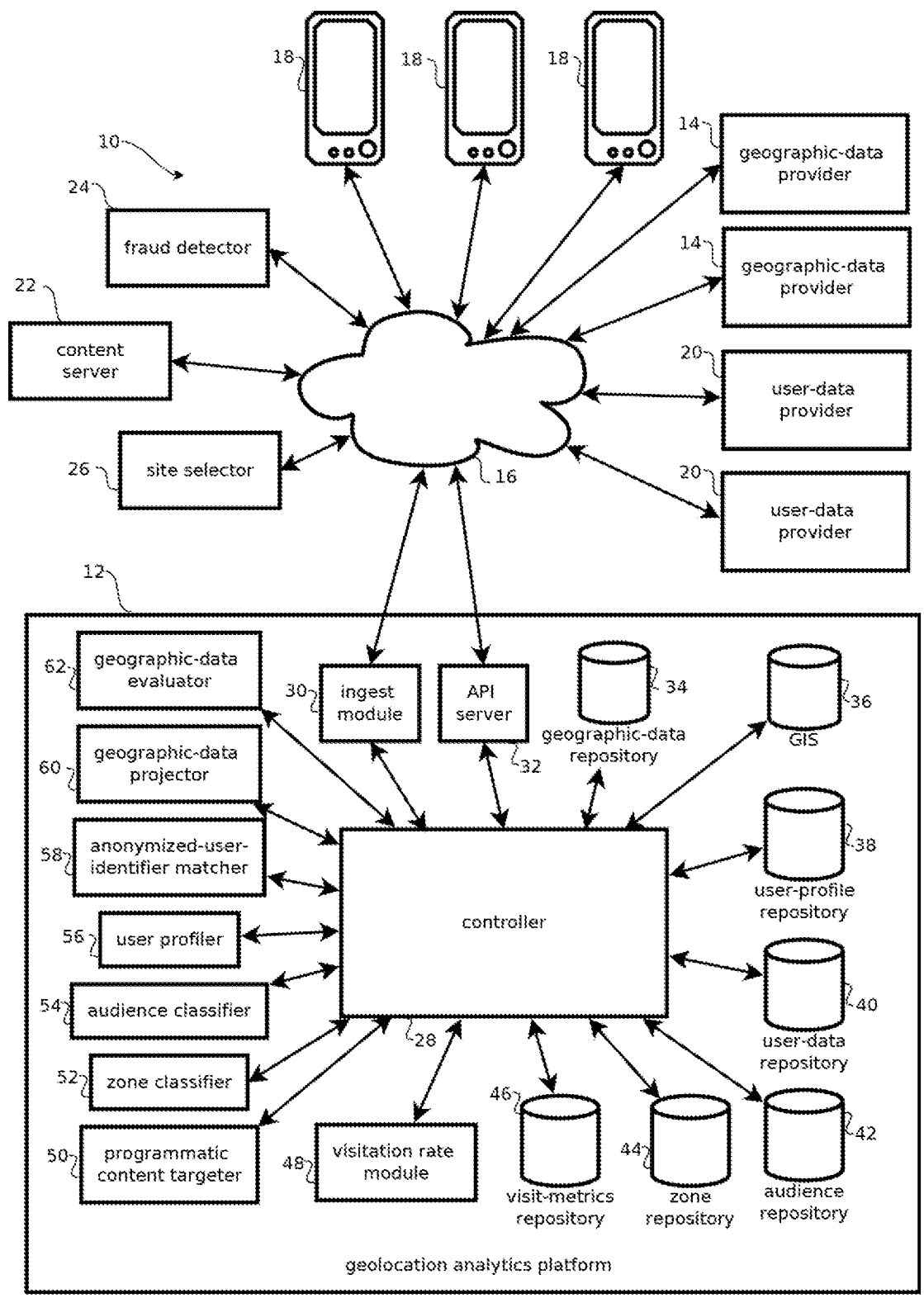
FIG. 1 shows an example of a computing environment having a location analytics platform consistent with the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of geolocation analytics. Indeed, the inventors wish to emphasize the difficulty of recognizing those problems that are nascent and will become much more apparent in the future should trends in the geolocation analytics industry continue as the inventors expect. Further, because multiple problems are addressed, it should be understood that some embodiments are problem-specific, and not all embodiments address every problem with traditional systems described herein or provide every benefit described herein. That said, solutions to many of these problems are described below.

FIG. 1 illustrates a computing environment 10 having an geolocation analytics platform 12 that, in some embodiments, classifies users as belonging to audiences based on relatively high dimensional data (e.g., based on more than ten, or more, and in many cases substantially more, dimensions). Further, as explained below, some embodiments may perform such classification based on diverse and, in some cases, unreliable data about consumer behavior by detecting and mitigating the effects of such data, while capturing some of the benefits of comprehensive data sets. That said, not all embodiments provide these benefits, as several independently useful inventions are described herein.

Embodiments of the geolocation analytics platform 12 may be implemented with one or more of the computing devices described below with reference to FIG. 4, e.g., by processors executing instructions stored in the below-described memory for providing the functionality described herein. FIG. 1 shows a functional block diagram of an example of the geolocation analytics platform 12. While the functionality is shown organized in discrete functional blocks for purposes of explaining the software and hardware by which the geolocation analytics platform 12 may be implemented in some embodiments, is important to note that such hardware and software may be intermingled, conjoined, subdivided, replicated, or otherwise differently arranged relative to the illustrated functional blocks. Due to the size of some geographic data sets (which may be as large as 100 billion content requests or geolocations, or larger, in some use cases), some embodiments may include a plurality of instances of the geolocation analytics platform 12 operating concurrently to evaluate data in parallel and some embodiments may include multiple instances of computing devices instantiating multiple instances of some or all of the components of the geolocation analytics platform 12, depending on cost and time constraints.

The geolocation analytics platform 12 may be understood in view of the exemplary computing environment 10 in which it operates. As shown in FIG. 1, the computing environment 10 further includes a plurality of geographic-data providers 14, the Internet 16, a plurality of mobile user devices 18, a plurality of user-data providers 20, a content server 22, a fraud detector 24, and a site selector 26. While a relatively small number of the above-described components are illustrated, it should be understood that embodiments are consistent with, and likely to include, substantially more of each component, such as dozens of geographic-data providers 14 and user data providers 20, hundreds of fraud detectors 24, content servers 22, and site selectors 26, and millions or tens of millions of user mobile devices 18. Each of these components may communicate with the geolocation analytics platform 12 or one another via the Internet 16. Some such communications may be used to either provide data by which audiences are classified according to geolocation history and other parameters, and some embodiments may use classified audiences for various purposes, such as serving content, detecting financial fraud, selecting real-estate sites, or the like. The components of the computing environment 10 may connect to one another through the Internet 16 and, in some cases, via various other networks, such as cellular networks, local area networks, wireless area networks, personal area networks, and the like.

FIG. 1 shows three geographic-data providers 14, but again, embodiments are consistent with substantially more instances, for example, numbering in the hundreds of thousands. The geographic-data providers 14 are shown as network connected devices, for example, servers hosting application program interfaces (APIs) by which geographic data is requested by the geolocation analytics platform 12, or in webpages from which such data is retrieved or otherwise extracted. It should be noted, however, that in some cases the geographic data may be provided by other modes of transport. For instance, hard-disk drives, optical media, flash drives, or other memory may be shipped by physical mail and copied via a local area network to on-board memory accessible to the geolocation analytics platform 12. In some cases, the geographic data is acquired in batches, for example, periodically, such as daily, weekly, monthly, or yearly, but embodiments are consistent with continuous (e.g., real-time) data feeds as well. Thus in some cases, the geographic-data providers 14 may provide geolocation histories that are non-contemporaneous (relative to when they are acquired) and span a relatively large period of time, such as several hours, several weeks, or several months in the past.

In many cases, the entity operating the geolocation analytics platform 12 does not have control over the quality or accuracy of the provided geographic data, as that data is often provided by a third-party, for instance, sellers of geocoded advertising inventory, the data being provided in the form of ad request logs from various publishers. For instance, the geographic-data providers 14 may be mobile website publishers, retargeting services, and providers of mobile device applications, or native apps. In some cases, the geographic data comprehensively canvasses a large geographic region, for example, every zip code, county, province, or state within a country, or the geographic data may be specific to a particular area, for example, within a single province or state for data gathered by local government or local businesses. Publishers acting as the provider of the geographic data may be an entity with geocoded advertising inventory to sell, e.g., ad impressions up for auction (e.g., logged over time) that are associated with a geographic location at which the entity represents the ad will be presented. In some cases, pricing for such advertising inventory is a function, in part, of the quality and accuracy of the associated geographic locations.

In some cases, the geographic-data providers 14 may provide location history data (e.g., from the mobile devices 18), such as ad request logs indicating, for instance, a plurality of requests for advertisements from publishers (e.g., operators of various websites or mobile device native applications), each request being for an advertisements to be served at a geolocation specified in the request. The geographic location specified in a given request may be used by an advertiser to determine whether to bid on or purchase the right to supply the requested advertisement, and the amount an advertiser wishes to pay may depend on the accuracy and quality of the identified geolocation. These location history records may contain a plurality of such requests, each having a geolocation (e.g., a latitude coordinate and a longitude coordinate specifying where a requested ad will be served), a unique identifier such as a mobile device ID (e.g., a device identifier of a end user device 18 upon which the ad will be shown) and a timestamp. In some cases, the device identifier may be a Unique Device Identifier (UDID) or an advertiser or advertising specific identifier, such as an advertising ID.

In FIG. 1, three mobile user devices 18 are illustrated, but it should be understood that embodiments are consistent with (and most use cases entail) substantially more user devices, e.g., more than 100,000 or more than one million user devices. The illustrated user devices 18 may be mobile handheld user devices, such as smart phones, tablets, or the like, having a portable power supply (e.g., a battery) and a wireless connection, for example, a cellular or a wireless area network interface, or wearable user devices, like smart watches and head-mounted displays. Examples of computing devices that, in some cases, are mobile devices are described below with reference to FIG. 4. User devices 18, however, are not limited to handheld mobile devices, and may include desktop computers, laptops, vehicle in-dash computing systems, living room set-top boxes, and public kiosks having computer interfaces. In some cases, the user devices 18 number in the millions or hundreds of millions and are geographically distributed, for example, over an entire country or the planet.

Each user devices 18 may include a processor and memory storing an operating system and various special-purpose applications, such as a browser by which webpages and advertisements are presented, or special-purpose native applications, such as weather applications, games, social-networking applications, shopping applications, and the like. In some cases, the user devices 18 include a location sensor, such as a global positioning system (GPS) sensor (or GLONASS, Galileo, or Compass sensor) or other components by which geographic location is obtained, for instance, based on the current wireless environment of the mobile device, like SSIDs of nearby wireless base stations, or identifiers of cellular towers in range. In some cases, the geographic locations sensed by the user devices 18 may be reported to the content server 22 for selecting content based on location to be shown on the mobile devices 18, and in some cases, location histories (e.g., a sequence of timestamps and geographic location coordinates) are acquired by the geographic-data providers 20, which may include content providers. In other cases, geographic locations are inferred by, for instance, an IP address through which a given device 18 communicates via the Internet 16, which may be a less accurate measure than GPS-determined locations. Or in some cases, geographic location is determined based on a cell tower to which a device 18 is wirelessly connected. Depending on how the geographic data is acquired and subsequently processed, that data may have better or less reliable quality and accuracy.

In some use cases, the number of people in a particular geographic area at a particular time as indicated by such location histories may be used to update records in the geolocation analytics platform 12. Location histories may be acquired by batch, e.g., from application program interfaces (APIs) of third-party providers, like cellular-network operators, advertising networks, or providers of mobile applications. Batch formatted location histories are often more readily available than real-time locations, while still being adequate for characterizing longer term trends in geographic data. And some embodiments may acquire some locations in real time (e.g., within 2 seconds of a request), for instance, for selecting content (like an advertisement, review, article, or business listing) to be displayed based on the current location.

The user-data providers 20 may provide data about users that is not necessarily tied to geolocation, such as purchasing history, media viewing history, automotive records, social networking activity, and the like. In some cases, user-data providers 20 include credit card processors, banks, cable companies, or television rating services. In some embodiments, user-data providers include microblogging services, location check-in services, or various other social networks. In some cases, audience classification according to geolocation may be supplemented with such data, for instance, according to the appearance of various keywords in social network posts, linkages between users indicated by social networks, or patterns in buying or reviewing behavior. In some cases, various features may be extracted from such data and included in the analysis described below for identifying audiences.

The illustrated content server 22 is operative to receive a request for content, select content (e.g., images and text), and send the content for display or other presentation to a user. One content server 22 is shown, but embodiments are consistent with substantially more, for example, numbering in the thousands. In some cases, the content is advertisements and advertisements are selected or bid upon with a price selected based on the geographic location of a computing device upon which an advertisement will be shown, which may be indicated by one of the geographic-data providers/content servers, or such entities may also be a publisher selling the advertising inventory. Accordingly, the accuracy and quality of such geographic data may be of relevance to the parties selling or buying such advertising space. The selection or pricing of advertisements may also depend on other factors. For example, advertisers may specify a certain bid amount based on the attributes of the geographic area documented in the geolocation analytics platform 12, or the advertiser may apply various thresholds, requiring certain attributes before an advertisement served, to target advertisements appropriately.

Some embodiments include a fraud detector 24 which may include an automated process run by a financial institution that detects anomalous behavior indicative of fraud based, in part, on correlations (or lack thereof) between financial transactions and patterns identified by the geolocation analytics platform 12. For instance, in some embodiments, the fraud detector 24 may submit a query to the geolocation analytics platform 12 based on a financial transaction, such as the purchase of a particular type of automobile, and the geolocation analytics platform 12 may respond with an audience classification of the user. In some embodiments the fraud detector 24 may determine whether the user who engaged in the financial transaction is likely to be a member of the audience for such purchases based on the data provided by the geolocation analytics platform 12. For example, a user who is not a member of an audience in Austin, Tex. that is present in Austin golf courses regularly, upon purchasing a set of golf clubs, may trigger a fraud alert, when the fraud detector receives a report for the geolocation analytics platform 12 that the user is not a member of an Austin, Tex., golf-playing audience. In some cases, the fraud detector may maintain an ontology of types of financial transactions and audiences associated with those transactions. Upon receiving a record of a financial transaction, the fraud detector may query audiences corresponding to the user, the location, and the time of the transaction, and determine whether the responsive audiences match those associated with the type of financial transaction in the ontology. Fraud may be detected based on the absence of such matches.

In some embodiments, the site selector 26 may categorize geographic areas as appropriate sites for various activities, such as positioning stores, allocating government resources, or distributing content into various zones based on geolocations frequented by audiences identified by the geolocation analytics platform 12. For instance, the site selector 26 may submit a request for zones in which members of a particular audience are present during lunch time and position restaurants in those zones.

In some embodiments, the geolocation analytics platform 12 may include a controller 28 that directs the activity of and routes data between the various components of the geolocation analytics platform 12. In some cases, the functionality of the controller may be divided into various processes, such as a separate controller for ingesting data, cleaning and normalizing data, classifying audiences and zones, targeting content, and evaluating the success of such targeting in driving visitation to various geographic locations. In some embodiments, activities other than programmatic content targeting may be performed as batch processes at times scheduled by the controller 28, such as daily or hourly, non-contemporaneously with when such data is used, to facility faster responses when the pre-processed data is used.

Some embodiments may include an ingest module 30 operative to retrieve data from the geographic-data providers 14 and user-data providers 20 via various APIs of such services. In some cases, such data may be routed by the controller 28 to a geographic data evaluator 62, examples of which are described in U.S. patent application Ser. No. 14/553,422, which is incorporated by reference in its entirety. The geographic-data evaluator may evaluate the quality of geographic data by geographic data provider and detect suspect, low-quality geographic data. Data from such providers with a history of providing low-quality data may be rejected from, or down-weighted in, the analyses described below, or such data providers may be stored with corresponding scores for purposes of bidding on the opportunity to serve advertisements or other content via such providers, for instance, in response to a content request for a website hosted by such a geographic-data provider.

Some embodiments may include an application program interface server 32, which may receive requests for information about audiences and geographic locations from the various entities operating devices 22, 24, and 26. In some cases, this may include requests by a third party content targeter for audiences corresponding to a current user device, at a current geolocation, requesting content at a current time (e.g., within the previous two seconds or so). In some cases, responsive data may include a list of audiences corresponding to these inputs or a list of scores for a plurality of audiences indicative of how well those inputs correspond to those audiences. In other examples, the request may include a request for an inventory of geographic areas corresponding to a specified audience, such as geographic areas or categories of places frequented by mobile device users who also frequent a given store or category of stores.

Some embodiments may include a geographic-data repository 34. The geographic-data repository 34, in some embodiments, stores geographic data from the geographic-data providers 14 and associated quality profiles of the geographic data, including measures of geographic data quality and accuracy provided by the geographic-data evaluator 62. In some embodiments, content providers, such as advertisers, or publishers, or others interested in the quality of geographic data from a given data provider 14 may query the geographic-data repository 34 for information output by the geographic-data evaluator 62.

Some embodiments may include a geographic information system 36. The geographic information system 36 may be configured to provide information about geographic locations in response to queries specifying a location or attribute of interest (or combinations thereof). In some embodiments, the geographic information system (GIS) 36 organizes information about a geographic area by quantizing (or otherwise dividing) the geographic area into area units, called tiles, that are mapped to subsets of the geographic area. In some cases, the tiles correspond to square units of area having sides that are between 10-meters and 1000-meters, for example, approximately 100-meters per side, depending upon the desired granularity with which a geographic area is to be described. Tiles are, however, not limited to square-shaped tiles, and may include other tilings, such as a hexagonal tiling, a triangular tiling, or other regular tilings (e.g., for simpler processing), semi-regular tilings, or irregular tilings (e.g., for describing higher density areas with higher resolution tiles, while conserving memory with larger tiles representing less dense areas). In some cases, such tilings may facilitate relatively fast access to data, such as in-memory data structures responsive to queries without retrieving data from a hard disk, though embodiments are not limited to systems that provide this benefit, which is not to suggest that any other feature described herein may also be omitted in some embodiments.

In some cases, polygons corresponding to businesses and other places, points corresponding to points of interest, and lines corresponding to roads, railroad tracks, and the like may also be stored in the geographic information system 36 as geographic features. In some cases, attributes of tiles overlapping such features may be mapped to these features, e.g., in proportion to the amount of area of a tile occupied by the corresponding feature and as a weighted combination of multiple tiles in which such a feature may be disposed, for instance, with such weights being proportional to the amount area of the feature in each respective tile. In some cases, the described attributes of the tiles may be mapped directly to the features, e.g., with a record for each such a feature, or subset of such a feature, like a floor of a store, or aisle of a store, with the features grouped according to the tile in which they are disposed for relatively fast searching of features by first retrieving a group of features in a single tile. To simplify the mapping, in some cases, irregular tiles may correspond to the boundaries of features.

In some cases, the attributes of a geographic area change over time. Accordingly, some embodiments divide each tile (or feature, if characterized separately, for example) according to time. For instance, some embodiments divide each tile into subsets of some duration of time, such as one week, one month, or one year, and attributes of the tile are recorded for subsets of that period of time. For example, the period of time may be one week, and each tile may be divided by portions of the week selected in view of the way users generally organize their week, accounting, for instance, for differences between work days and weekends, work hours, after work hours, mealtimes, typical sleep hours, and the like. Examples of such time divisions may include a duration for a tile corresponding to Monday morning from 6 AM to 8 AM, during which users often eat breakfast and commute to work, 8 AM till 11 AM, during which users often are at work, 11 AM till 1 PM, during which users are often eating lunch, 1 PM till 5 PM, during which users are often engaged in work, 5 PM till 6 PM, during which users are often commuting home, and the like. Similar durations may be selected for weekend days, for example 8 PM till midnight on Saturdays, during which users are often engaged in leisure activities. In some cases the divisions of time are logically connected but are disjoint, for instance, morning and evening commute times may be classified in a single category of time corresponding to commuting. Each of these durations may be profiled at each tile.

In some embodiments, the geographic information system 36 includes a plurality of tile (or feature, if separately tracked) records, each such record corresponding to a different subset of a geographic area. Each tile (or feature) record may include an identifier, an indication of geographic area corresponding to the tile (which for regularly sized tiles may be the identifier from which location can be calculated or may be a polygon with latitude and longitude vertices, for instance), and a plurality of tile-time records. Each tile-time record may correspond to one of the above-mentioned divisions of time for a given tile, and the tile-time records may characterize attributes of the tile at different points of time, such as during different times of the week. Each tile-time (or feature-time) record may also include a density score indicative of the number of people in the tile at a given time. In some embodiments, each tile-time record includes an indication of the duration of time described by the record (e.g., lunch time on Sundays, or dinnertime on Wednesdays) and a plurality of attribute records, each attribute record describing an attribute of the tile at the corresponding window of time during some cycle (e.g., weekly). Some embodiments may include seasonal variants of such time designations, e.g., a set of time categories for the Christmas season, a set for Summer, and a set for the remainder of the year, constituting a type of time-tile record called a time-tile-season record.

The attributes may be descriptions of activities in which users (e.g., of third party services that provide data to the geolocation analytics platform 12) engage that are potentially of interest to advertisers or others interested in geographic data about human activities and attributes (e.g., geodemographic data or geopsychographic data). For example, some advertisers may be interested in when and where users go to particular types of restaurants, when and where users play golf, when and where users watch sports, when and where users fish, or when and where users work in particular categories of jobs. In some embodiments, each tile-time record may include a relatively large number of attribute records, for example, more than 10, more than 100, more than 1000, or approximately 4000 attribute records, depending upon the desired specificity with which the tiles are to be described. Each attribute record may include an indicator of the attribute being characterized and an attribute score indicating the degree to which users tend to engage in activities corresponding to the attribute in the corresponding tile at the corresponding duration of time. In some cases, the attribute score (or tile-time record) is characterized by a density score indicating the number of users expected to engage in the corresponding activity in the tile at the time. In some cases, attributes may be organized in a hierarchical ontology, for instance, businesses→retail→convenience_stores, or demographic→suburbanite→young_professional.

Thus, to use some embodiments of the geographic information system 36, a query may be submitted to determine what sort of activities users engage in at a particular block in downtown New York during Friday evenings, and the geographic information system 36 may respond with the attribute records corresponding to that block at that time. Those attribute records may indicate a relatively high attribute score for high-end dining, indicating that users typically go to restaurants in this category at that time in this place, and a relatively low attribute score for playing golf, for example. Or a query may request tiles or features for which a given attribute score is exhibited. Attribute scores may be normalized, for example, a value from 0 to 10, with a value indicating the propensity of users to exhibit behavior described by that attribute. In some cases, scoring attributes according to a discrete set of normalized values may facilitate use of in-memory data structures that provide relatively fast access to information, though embodiments are not limited to systems that provide this benefit, which is not to suggest that any other feature described herein may also be omitted in some embodiments. Further, the attribute scores may be pre-calculated before such scores are used in an analysis, as some forms of analysis are relatively latency sensitive, such as content selection, which users are expected prefer to have happen within less than 500 milliseconds, while calculating attribute scores may take substantially longer.

In some cases, the user-profile repository 38 may store profiles of users of mobile devices 18 that are based on a user's geolocation history and in some cases data from user-data providers 20. In some cases, these user profiles may be created by a user profiler 56, an example of which is described in U.S. Pat. No. 8,489,596, the entire contents of which are incorporated by reference. The user profiler 56 may join the location histories of user devices corresponding to a user and tile records implicated by locations in those location histories to generate user profiles. Thus, users may be characterized according to the attributes of the places those users visit at the time the user visits those places. The generated user profiles may then be stored by the user profiler 56 in the user-profile repository 38.

The illustrated user-profile repository 38 includes a plurality of user-profile records, each record corresponding to the profile of a given user or a given mobile device 18. Each user-profile record may include an identifier of the record (which may be a value otherwise uncorrelated with the identity of the user to enhance privacy), and an identifier of the source or sources of the location histories from which the profile was created such that subsequent location histories can be matched with the profile (e.g. a account associated with a special-purpose native application, a cell phone number, or some other value, which may be hashed to enhance user privacy).

Each user-profile record may also include a plurality of profile time (or profile-time-season) records indicating attributes of the user profile at different times during some cycle of time (e.g., portions of the week or month, or during other periods like those described above with reference to the geographic information system 36). In some cases, the profile-time records may correspond to the same durations of time as those of the time-tile records described above. Each profile-time record may include an indication of the duration of time being described (e.g. Thursdays at dinnertime, or Saturday midmorning) and a plurality of profile attribute records, each profile attribute record indicating the propensity of the corresponding user to engage in an activity, or exhibit a property, described by the attribute during the corresponding time of the profile-time record. The profile time records may allow tracking of when users tend to engage in a given activity (e.g., time of day, day of week, week of year). In some embodiments, the profile attribute records correspond to the same set of attribute records described above with reference to the geographic information system 36. Each profile-attribute record may include an indication of the attribute being characterized (e.g., attending a children's soccer game, having brunch at a fast-casual dining establishment, parent running errands, or shopping at a mall) and a score indicating the propensity of the user to engage in the activity at the corresponding time, such as a normalized value from 0 to 10. The attribute records may further include a sample size, indicative of the number of samples upon which the attribute score is based, for weighting new samples, and a measure of variance among these samples (e.g., a standard deviation) for identifying outliers.

As described below, the user-profile records may be used for a variety of purposes. For example, publishers operating content server 22 may submit to the geolocation analytics platform 12 a query identifying one of the user-profile records, such as a hashed value of a user account number or phone number, and the geolocation analytics platform 12 may respond with the attributes of the corresponding user at the current time. In some embodiments, to further enhance user privacy, queries may be submitted for a specific attribute to determine whether to serve content corresponding to the attribute, or a query may request a binary indication of whether the attribute score is above a threshold.

In another example, the user-profile repository 38 may be used by the user profiler 56 to augment the records in the geographic information system 36. For example, an index may be created for each attribute that identifies tiles where users having relatively strong scores (e.g. above a threshold) for the respective attribute tend to co-occur at given times. These indices may correspond to heat maps (though no visual representation need be created) indicating where, for example, users interested in golf tend to be during various times of the day, such that content-providers can select content based on this information, or related services may be positioned nearby. In some embodiments, an index may be created for each user attribute at each of the above-described divisions of time in the geographic information system 36, and these indices may be queried to provide relatively prompt responses relating to where users having a given attribute or combination of attributes tend to co-occur at various times. Precalculating the indices is expected to yield faster responses to such queries than generating responsive data at the time the query is received. For instance, using examples of these indices relating to fishing and employment in banking, an advertiser may determine that people who engage in fishing on the weekend and work in banking tend to drive relatively frequently along a particular stretch of road on Mondays during the evening commute, and that advertiser may purchase an advertisement for bass fishing boats as a source of relaxation for bankers on a billboard along that road in response.

In some cases, user profiles may be supplemented with data from the user-data providers 20. In some embodiments, a user-data repository 40 may store such data as it is acquired for further analysis. Further, in some embodiments, the quality of data from such data providers may be scored, and such scores may be associated with identifiers of the providers in the user-data repository 40. In some embodiments, this data may be down-weighted or rejected based on indicators of low-quality.

Some embodiments may include an audience repository 40 storing records by which audience membership may be determined. These records, in some cases may be created and accessed by an audience classifier 54 described below with reference to FIGS. 2 and 3. In some cases, audience membership is pre-calculated before a query is received, for example, for each recognize query within some parameter space, for instance, for every type of attribute record, pair of attribute records, or attribute record combined with larger geolocation area, like weekend golfers in the state of Texas. In some cases, parameters of models by which audience membership is determined may be stored in the audience repository 42, for example, learned parameters that are pre-calculated according to training sets. In some cases, an audience membership vector may be calculated based on a given geographic location, a given user identifier (e.g., a device identifier), and given time, with each component of the vector indicating membership in a corresponding audience. In some cases, membership may be binary, or some embodiments may score membership, for example from 0 to 10 depending on the probability of membership in the corresponding audience given the inputs. In some cases, each component of the audience vector may be calculated according to an audience member function that is a combination (e.g., weighted sum) of feature functions. Examples of such feature functions may include scores indicating whether a given user is currently within a tile having a particular attribute score (or collection of attribute scores) above a threshold, whether a given user has visited tiles having a particular attribute score above a threshold at particular times more than a threshold amount of times within some trailing duration, and the like. In some cases, a collection of audience vectors for each user may be stored in the respective user profile, e.g., as a sparse matrix having rows or columns indexed according to times and geolocations at which the corresponding audience vector applies. In some cases, identifying feature functions with predictive value can be relatively challenging given the relatively large, high-dimensional search space of candidate feature functions in many commercially relevant implementations. Techniques for discovering such features are described in greater detail below with reference to FIG. 2.

Some embodiments may include a zone repository 44, which may include zone records populated by a zone classifier 52. Zones may be geographic areas associated with audiences. For example, some embodiments may identify geographic areas that students at a local university tend to visit, with the corresponding audience being likely students at a given university or collection of universities, or those who are regularly at such universities (e.g., more than a threshold amount of times in a trailing duration of time). In some cases, the zone repository may include zone records that list tiles or time tiles likely to be visited by members of particular audiences. In some cases, zones may be classified according to an amount of mutual information between of events corresponding to audience membership and members of those audiences visiting particular tiles. In some cases, the mutual information may be calculated in terms of a conditional entropy, and tiles having the highest mutual information (for example, greater than a threshold amount of tiles, like a threshold percentage) may be selected for consideration as members of the zone for that audience.

In some cases, the selected candidate tiles may be clustered and resulting clusters may be designated as zones. Some embodiments may execute a density-based clustering algorithm, like DBSCAN, to establish groups corresponding to the resulting clusters and exclude outliers. Some embodiments may examine each of the geolocations reflected in the records and designate a tile as a core tile if at least a threshold amount of the other tiles in the records are within a threshold geographic distance or number of tiles. Some embodiments may then iterate through each of the tiles and create a graph of reachable geolocations, where nodes on the graph are identified in response to non-core corresponding tiles being within a threshold distance of a core tile in the graph, and in response to core tiles in the graph being reachable by other core tiles in the graph, where two tiles are reachable from one another if there is a path from one tile to the other tile where every link and the path is a core tile and the tiles in the link are within a threshold distance of one another. The set of nodes in each resulting graph, in some embodiments, may be designated as a cluster, and points excluded from the graphs may be designated as outliers that do not correspond to clusters. Outliers may be excluded from zones in some cases.

Some embodiments may include a visit-metrics repository 46 having records created by a visitation rate module 48. In some cases, the records may indicate the degree to which content targeted to particular users succeeded in driving those users to visit a targeted geographic location, for example, records indicating whether an advertisement targeted to users in a particular neighborhood succeeded in driving those users to visit a particular store. In some cases, the visitation rate module 48 may include the visitation rate module of U.S. patent application Ser. No. 13/769,736, the entire contents of which are incorporated by reference. In some cases, visitation rates may be adjusted to account for undercounting of undetected people, for example, those not employing cell phones while in the targeted location or employing cell phones that are not detectable, for instance, due to lack of signal quality for a particular type of handset or carrier. In some cases, such undercounting may correlate with various attributes of the user, including the user's mobile device, and some embodiments may adjust detected visitation rates to account for such undercounting. Some embodiments may measure a marginal increase in an amount of visits to a target geographic location likely to be attributable to targeted content. For example, some embodiments may identify audience members, serve targeted content to some of the audience members (e.g., a treatment group), and compare visitation amounts (e.g., calculate a statistically significant amount of difference between) between those audience members that receive the targeted content and those that did not (e.g., a control group of the audience) to determine a marginal increase attributable to the targeted content. Feedback from such measurements may be used to tune audience classification algorithms or select among audiences, e.g., dynamically unselecting audiences for which a response fails to satisfy a visitation threshold. That said, not all embodiments necessarily provide these benefits, which is not to suggest that any other feature may not also be omitted in some cases.

Some embodiments may include a programmatic content targeter 50. In some cases, this module may automatically determine whether to provide content and which content to provide, in some cases at the time of the content request, based on classification of audiences or zones. In some embodiments, the programmatic content targeter 50 may programmatically determine audience membership and determine a bidding amount for submitting a bid to an online auction to provide an advertisement to a given user. To facilitate relatively fast responses to such time sensitive requests, some embodiments may pre-calculate zone classifications and audience classifications and index those classifications according to parameters of a content request (e.g., according to key values based on (such as hash values of) one or more of a device or user identifier, a geographic location, and a category of time corresponding to the time tile records). In some cases, bidding may be real-time, e.g., within less than 500 milliseconds of when an ad is requested, and often even sooner. In other cases, advertising space may be pre-purchased programmatically before ad requests, e.g., based on expected audience behavior in the coming hours or days. In other cases, other types of content may be programmatically targeted, e.g., business listings or articles based on audience membership. Programmatic targeting based on audience classification is expected to reduce labor costs relative to manual tuning and targeting of content. That said, not all embodiments necessarily provide these benefits, which is not to suggest that any other feature may not also be omitted in some cases.

Some embodiments may include an anonymized-user-identifier matcher 58, an example of which is described in U.S. patent application Ser. No. 14/334,066, the entire contents of which are incorporated by reference. In some cases, a user may switch mobile devices or be reassigned a device identifier. Re-creating a user profile for that user based on the new identifier can be time-consuming and particularly difficult at commercially-relevant scales. Accordingly, some embodiments of the matcher 58 may detect matches between geolocation patterns of a new user identifier and an old user identifier to assign that new identifier to an existing user profile when such matches are detected. This is expected to yield more accurate classifications of audiences based on more complete data for individuals using two different devices. That said, not all embodiments necessarily provide these benefits, which is not to suggest that any other feature may not also be omitted in some cases.

Some embodiments may further include a geographic-data projector 60, an example of which is described in U.S. patent application Ser. No. 13/938,974, the entire contents of which are incorporated by reference. In some cases, geographic-data providers may provide data at a relatively low resolution, e.g., census data reported at the zip code level. Some embodiments may un-evenly project such values onto higher-resolution geographic areas (e.g., some instances of the tile records or corresponding geographic features) within the low-resolution area based on a distribution of a population within that larger geographic area. Accordingly, some embodiments may enrich the records of the geographic information system 36 by which audiences and zones are identified with information that would otherwise be inapplicable or inaccurately applied. That said, not all embodiments necessarily provide these benefits, which is not to suggest that any other feature may not also be omitted in some cases.

Figure 2:
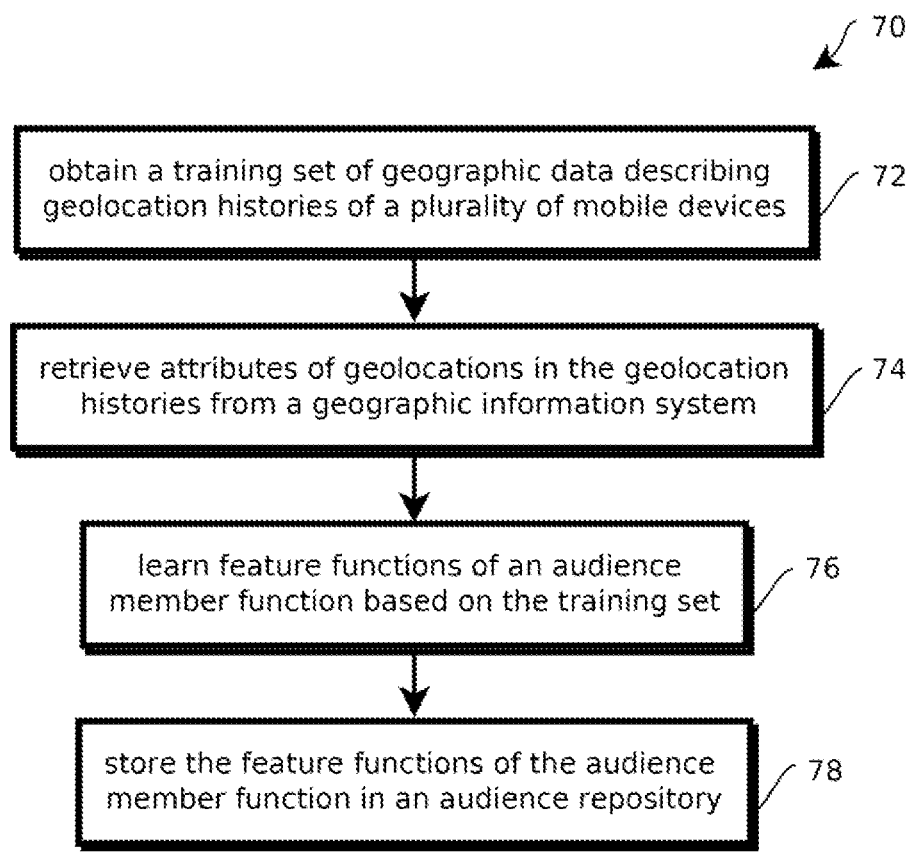
FIG. 2 shows an example of a process for learning an audience member function.
Figure 3:
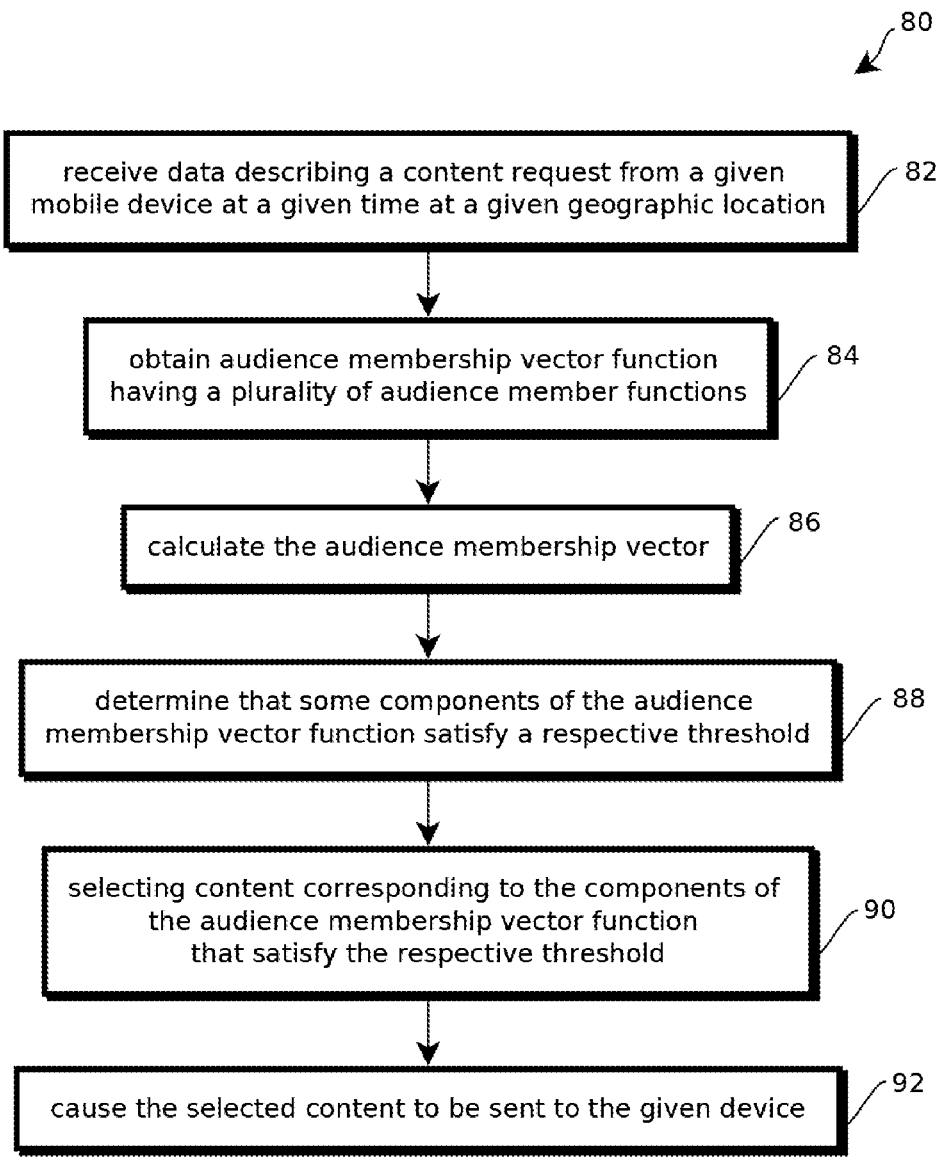
FIG. 3 shows an example of a process of targeting content based on an audience membership vector function including the audience member function of FIG. 2.

FIGS. 2 and 3 show techniques for modeling and detecting audiences. In some cases, the techniques may include an adaptive process by which features indicative of audience membership are programmatically learned, e.g., by iteratively modeling the audience and adjusting the model to reduce a measure of error produced by the model when applied to a training set of data in which audience membership status is known. Some embodiments may be configured to learn weights for combining (e.g., in a weighted sum, or in a neural net) features into a classification or score of probability of audience membership. Some embodiments may be configured for real-time model optimization by re-learning these parameters in the face of new data. Some embodiments may be configured to automatically discover, select, and score the importance of features in relatively high-dimensional data for classifying an audience.

FIG. 2 shows an example of a process 70 for learning an audience member function based on training data. In some cases, the model includes obtaining a training set of geographic data describing geolocation histories of a plurality of mobile devices, as indicated by block 72. Obtaining such a training set may include querying the user-profile repository 38 or the geographic information system 36 to identify users who have previously engaged in a targeted behavior. Targeted behaviors may serve as a training set selection criteria. In some cases, targeted behaviors include visiting a particular store within a threshold duration of time or with greater than a threshold frequency in a threshold duration of time. In another example a targeted behavior may include visiting a category of store according to such criteria. In another example, targeted behaviors may include exhibiting demographic attributes, like being a suburban young professional who plays golf on the weekend in the state of California more often than once a month over the trailing year. In some cases, training sets corresponding to relatively specific targeted behaviors may be retrieved relatively quickly with a distributed, scripted parallel program implemented with the techniques described in U.S. Provisional Patent Application 62/066,100, the contents of which are hereby incorporated by reference. Relatively fast, iterative exploration of candidate targeted behaviors with these techniques is expected to yield training sets suitable for creating well-crafted audiences. That said, not all embodiments provide this benefit, as various independently useful inventions are described herein.

The obtained training set may include geolocation histories, user profiles, and user data (e.g., financial transactions, television viewing patterns, social network activity, and the like) for each of a plurality of users who have exhibited the targeted behavior. In some cases, such data may include a relatively large number of dimensions, for example, including attribute scores for each of the above-described attributes, attribute scores for each of the above-attributes relating to behavior within some threshold duration of time, and attribute scores for each of the above described attributes relating to behavior with greater than a threshold frequency within a threshold duration of time. Further, such dimensions may include scores for the other user data, such as frequencies or amounts of financial transactions indicating purchases in a given category, such as frequencies or amounts of purchases within a threshold duration of time. Other examples may include amounts of adjacent nodes in a social network quantified with the above-described dimensions or frequency or amounts of viewing particular television shows or particular categories of television shows.

In some cases, the process 70 may include retrieving attributes of geolocations in the geolocation histories from a geographic information system, as indicated by block 74. In some cases, such attributes may be retrieved in the course of generating the above-described user profiles. In other cases, such attributes may be retrieved at the time of model training. For example, a given location history for a given user may indicate that the user within a given tile (for example, a particular tile for more than a threshold duration of time or more than a threshold frequency), and the attributes of that tile (or geographic feature, if independently tracked), or of that time tile may be retrieved from memory to serve as dimensions from which features are selected for an audience membership function. This technique may be used in cases in which the tiles correspond to or are overlaid with features, like polygons, corresponding to businesses in other geographic features to which attributes are mapped, by determining which features include the user's location and acquiring attributes of those features.

Some embodiments may learn feature functions of an audience member function based on the training set, as indicated by block 76. In some cases, audience member functions may be learned by training various types of machine learning classification or regression models, such as support vector machines, self organizing maps, binary classification decision trees, or regression decision trees.

By way of example, let device $d_z$ generate a content-request at time i within tile j, a request which may be represented as $r_{i,j,z}$. Some embodiments may obtain an audience-membership vector function $\bar{t}(r_{i,j,z})$ where its kth dimension has value 1 if device $d_z$ is deemed to belong to the kth audience in the audience set, and 0 otherwise. Other embodiments may produce a more fine-grained score indicative of membership, e.g., a value between 0 and 1. Some embodiments may detect K discrete audiences.

In one simpler case, the audiences represented in vector $\bar{t}(r_{i,j,z})$ are all categorical, audiences which are expressible as the intersection of tiles and time period categories, and device histories play no role in the audience membership functions ($f_k(\ )$). Thus, in this example, $\bar{t}(r_{i,j,z})=[f_1(i, j), f_2(i, j), \ldots, f_K(i, j)]$. In some cases, these functions may be pre-computed, before a content (e.g., ad) request is received and stored in sparse tables and cached in memory for fast retrieval.

In a more general case, some embodiments may compute $\bar{t}(r_{i,j,z})$ based on more general features. To this end, some embodiments may calculate an audience membership functions $f_k(r_{i,j,z})$ and determine whether resulting values satisfy a respective ones of a collection of thresholds $t_k$ so that:

$$\bar{t}_k = \begin{cases} 1 & \text{when} \quad f_k(r_{i,j,z}) > t_k \\ 0 & \text{otherwise} \end{cases}$$

In some cases, thresholds $t_k$ may be heuristically established by an analyst and feature functions may be crafted by an audience designer. In other cases, such activities may be automated.

Some audience membership functions may consider richer features. In some cases, such functions may represent class posterior probabilities as follows:

$$f_k(r_{i,j,z}) = p(\text{audience} = c_k | \text{features}_{r_{i,j,z}})$$

Where features$_{r\_sub\_i,j,z}$ sub is the collection of features generated after knowing i, j, and z, or the device (or user, in the case where a given user has multiple correlated devices), time, and location of the request.

Some embodiments may model these probabilities with an adaptive basis function model approach, such as that described in chapter sixteen of K Murphy. *Machine Learning: A probabilistic approach, Adaptive Computation and Machine Learning series* (The MIT Press, 2012), a chapter which is incorporated by reference. In some cases, such a model may be expressed as follows:

$$p(\text{audience} = c_k | \text{features}_{r_{i,j,z}}) \propto f_k(\text{features}_{r_{i,j,z}})$$

with the form:

$$f_k(\text{features}_{r_{i,j,z}}) = w_0 + \sum_{m=1...M} w_m \phi_m(i, j, z)$$

Where $\theta_m(i,j,z)$ is the m'th basis function that is learned from the training set, $w_m$ is the mean response in a region corresponding to the m'th basis function, and $w_0$ is an offset. In some cases, both weights and parameters of the basis function itself may be learned, in contrast to less expressive models that merely learn weights with a fixed basis function, like many simpler neural nets.

This formulation, in some cases, offers several advantages, allowing content targeters to robustly work with a combination of categorical and continuous features, large-dimensional spaces, missing values, kernel approaches, etc. Some embodiments may further include hierarchical models where probabilistic classifiers feed class posterior probabilities as features in this function. That said, not all embodiments provide these benefits, as various independently useful inventions are described.

In some cases, an audience member function may be learned by growing a binary regression or classification tree. In some cases, such a tree may be calculated, or grown, by recursively dividing a vector space occupied by the training data such that a training error is minimized in each division. In some cases, such divisions may be selected with a greedy algorithm that minimizes training error at a given iteration, rather than globally, to reduce computational complexity.

In some cases, the training data may be characterized as a collection of vectors, with each vector corresponding to an individual that engaged in the targeted behavior, and each component of such vectors corresponding to a candidate dimension from which a feature may be selected. As noted above, candid dimensions include, for example, various attribute scores of user profiles and tiles visited by users, in some cases, aggregated across trailing durations of time or quantified according to frequency within some trailing duration of time. In some cases, such vectors may have a relatively large number of dimensions, such as more than 10 for simpler cases, more than 1,000, and more than 10,000 for relatively rich data sets.

In some cases, a binary classification or regression decision tree may be grown by selecting a dimension and the value for that dimension in the vector space that minimizes or reduces a training error when the vector space is divided parallel to that dimension at that value, e.g., in a three-dimensional example, by a plane having a normal vector parallel to the chosen dimension and crossing an axis of the chosen dimension at the value chosen. Some embodiments may iterate through every dimension and every value (or between pair of adjacent values, when sorted) occupied by a vector in the training set in the respective dimension (as splits are expected to occur between values occupied by vectors) to calculate a training error for a split in vector space along that dimension between the respective values. Training errors for a plurality of candidate splits, each split being characterized by a pair identifying a value and a dimension, may be calculated, and some embodiments may select the split having the lowest training error.

In some cases, the training error may be characterized as an impurity measure indicative of the purity with which the candidate division in vector space, or split, separates vectors corresponding to audience members from vectors corresponding to non-audience members. For example, a division, or split, in which 9/10 vectors are audience members on one side and 8/10 vectors are non-audience members on the other may have a lower impurity measure relative to a division in which 6/10 vectors are audience members on one side and 7/10 vectors are non-audience members on the other side. Various impurity measures may be calculated, including a misclassification rate based on the proportion of vectors and each division that are misclassified if each division classifies according to a majority vote of vectors in the respective division. In other examples of an impurity measure, and entropy of audience members and non-audience members on each side of the division may be calculated or a Gini index may be calculated.

In some cases, to expedite processing, the evaluation of candidate splits may be executed in parallel by assigning different candidate dimensions and different candidate values within those dimensions to different computing nodes in a distributed computing network. For example, some embodiments may map candidate splits to one set of computing nodes and reduce impurity measures from the resulting regions with a different set of computing nodes, for instance, according to a MapReduce algorithm executed by a distributed computing network having a plurality of computing nodes, such separate computers or separate instances of virtual machines.

After a split, as a result of the split, the portion of vector space at issue may be divided into two regions divided in a selected dimension at a selected value. The division may be characterized as a node in a binary decision tree, the node corresponding to a split rule, like weekend golfer score greater than seven, and the two resulting regions may be characterized as edges extending from that node in a binary decision tree, each edge representing an outcome of the decision rule, like true or false. In some cases, the subregions corresponding to each of those edges may be recursively subjected to the above-described procedure for dividing a region of vector space such that the training error is minimized in the division of the portion of vector space at issue. Training vectors in one subregion may undergo the above process, and training vectors in the other subregion may separately undergo the above process, producing four sub-subregioins. Such divisions may yield additional nodes in a decision tree corresponding to additional rules, for example, young professional attribute score less than three, and additional subdivisions of the vector space. This process may be repeated recursively until a stopping condition is satisfied in each branch of the binary decision tree.

A variety of stopping conditions may be evaluated before performing a split on a region of vector space. A determination may be made as to whether all vectors in the region of vector space are all members of the audience in the training set, or a determination may be made as to whether all vectors in the region of vector space are all not members of the audience in the training set. In either case, the region of vector space may not be further subdivided in response, and the resulting region may be designated as a leaf node indicating that vectors in the corresponding region are to be designated as audience members or not audience members, depending upon whether all members of the training set are audience members or not audience members. In another example of a stopping condition, some embodiments may count a number of training vectors in a candidate split or in a input region and decline to make the candidate split or further split the subregion in response to the count being less than a threshold value to avoid overfitting, e.g., with a large number of leaf nodes each corresponding to a single respective vector.

In some cases, the resulting leaf nodes of the binary decision tree may correspond to classifications of whether vectors in the regions of space described by those leaf nodes are audience members or not audience members. For example, if a majority of training vectors in a leaf node region are audience members, some embodiments may designate later-received, non-training vectors (e.g., when the model is applied) in those regions as corresponding to audience members, and vice versa. The model may be applied by navigating the decision tree to a leaf node based on dimensions of a vector to be classified, and classifying the vector according to the leaf node's relative amount of audience member and non-audience member training vectors. In some cases, the designation may be associated with a confidence value corresponding to the impurity value of the region described by the leaf node.

In some embodiments, resulting decision trees may be pruned to reduce overfitting. For example, a training error may be calculated for each leaf node, the leaf nodes may be ranked according to training error, and those leaf nodes above a threshold position in the ranking, having the greater training errors, may be pruned from the tree.

In some embodiments, such decision trees may be relatively unstable and sensitive to relatively small changes in inputs. To mitigate such instabilities, some embodiments may perform a bootstrap aggregation by subsampling the training data, calculating binary decision trees on the subsamples in a plurality of iterations, and then aggregating the resulting plurality of decision trees to produce an aggregated binary classification decision tree.

The resulting binary classification decision tree (e.g., one or more per audience) may be stored in the audience repository, for example, by storing feature functions of the corresponding audience member function in the audience repository, as indicated by block 78. In some embodiments, such feature functions and the audience member functions to which they belong may be precalculated before audience classification is performed on nontraining data to facilitate relatively fast retrieval and classification. For example, audience member functions may be calculated daily or hourly for a particular geographic region in which a given content provider is interested, thereby providing relatively low latency audience classification that is responsive to changing conditions in user behavior.

FIG. 3 shows an example of a process 80 by which a request for content may be serviced by designating the request as corresponding to one or more audiences and selecting responsive content. In some embodiments, the process 80 includes receiving data describing the content requests from a given mobile device at a given time at a given geographic location, as indicated by block 82. In some cases, the request includes a device identifier that may be correlated to a user profile and location history, and a given time, and may be a timestamped geolocation, such as latitude and longitude, sensed by the mobile device, for example, at the time of a request for advertising content or other content.

Next, some embodiments may obtain an audience membership vector function having a plurality of audience member functions, as indicated by block 84. In some embodiments, some or all of the audience member functions may be learned with the process described above with reference to FIG. 2. In other cases, some of the audience member functions may be obtained with other techniques, such as hand-coded rules specifying particular time tiles that correspond to audiences. In some embodiments, the audience membership vector function may include a relatively large number of candidate audiences, such as more than 10, or more than 100, depending upon the granularity with which content is to be targeted. Relatively granular targeting is expected to facilitate selection of relatively highly customized content to which subgroups of populations are expected to be responsive. In some cases, the audience membership vector function may be retrieved from the audience repository 42, for example, by the audience classifier 54 at the direction of the programmatic content targeter 50, as shown in FIG. 1.

Next, some embodiments may calculate the audience membership vector, as indicated by block 86. In some cases, the request for content may be encoded as a vector, like those used in the training sets described above. For example, dimensions of the vector may include the current time, or corresponding time tile designation of the user, attributes of the user's current geolocation, such as tile attributes, and various attributes of a user profile or data in user location history of a user corresponding to a device identifier in the request for content. In some embodiments, for each dimension of the audience membership vector, a corresponding audience member function may be retrieved and calculated with the vector of the request as an input. In some cases, such calculation may include navigating a plurality of the binary classification decision trees produced with the above described techniques. In some embodiments, the request vector may be designated as corresponding to the respective audience based on whether a leaf node of the corresponding tree had a majority of training vectors in the audience or not in the audience (e.g., a majority in the audience means the input vector and corresponding request are classified as belonging to the audience, and vice versa).

Next, some embodiments may determine that some components of the audience membership vector function satisfy a respective threshold, as indicated by block 88. In some embodiments, each leaf node of a decision tree may include a confidence value, for example, indicating an amount of training error attributable to the respective leaf node.

Request vectors mapped to a given leaf node may be associated with these confidence values, and the confidence values may be compared to a threshold corresponding to the respective audience described by the respective audience membership function of the audience membership vector function.

Next, some embodiments may select content corresponding to the components of the audience membership vector function that satisfy the respective threshold, as indicated by block 90. Some embodiments may rank responsive audiences based on confidence values, or some audiences may be deemed more valuable than others and may be selected even with lower confidence values. In some embodiments, each audience may be associated with a valuation score, and confidence values may be multiplied by the valuation scores to produce a ranking value from which responsive audiences are selected. In some embodiments, content may be mapped to multiple audiences, and audience ranking values may be aggregated according to content (for example, as a weighted sum) and the content ranked according to content ranking values. In some cases, the highest ranking content may be selected. In some cases, selecting content includes selecting a value that corresponds to content in another system, e.g., reporting audience membership by which another system retrieves content corresponding to the audience.

Next, some embodiments may cause the selected content to be sent to the given device, as indicated by block 92. Causing the content to be sent may include retrieving the content from memory and transmitting the content, sending instructions for the user device to retrieve the content from a third-party content hosting service, or sending data by which a decision to purchase the right to serve the content is made. In some cases, causing the content to be sent may include sending information upon which a bid in an advertising auction is calculated, for example, a binary value indicating audience membership that causes an advertiser to submit a bid in response.

In some embodiments, to expedite processing, calculation of the audience membership vector components may be executed in parallel, with each dimension being executed, for example, in a different thread or different computing node. In some embodiments, the component calculations may be mapped to a plurality of different computing nodes, and values of the components may be reduced by other computing nodes by comparing confidence values to threshold values, as described above, for example, with a MapReduce algorithm.

In some embodiments content, such as advertisements, business listings, articles, and the like may be selected according to correspondence with the responsive audiences. In some embodiments, content targeters may identify content in advance as being targeted to particular audiences. For example, an advertiser may wish to send a particular advertisement to young suburbanite professionals who golf on the weekends and frequent a particular store. In some cases, a training data set may be identified by querying existing records for users who have exhibited this targeted behavior. That training set may then be input to the process of FIG. 2 to train a model that identifies other users likely to engage in the targeted behavior as well. Later, when a new request for content is received, that request may be input into the resulting model, and audience membership may be detected, thereby indicating to an advertiser that the corresponding advertisement should be sent, as the user is likely to engage in the targeted behavior.

Figure 4:
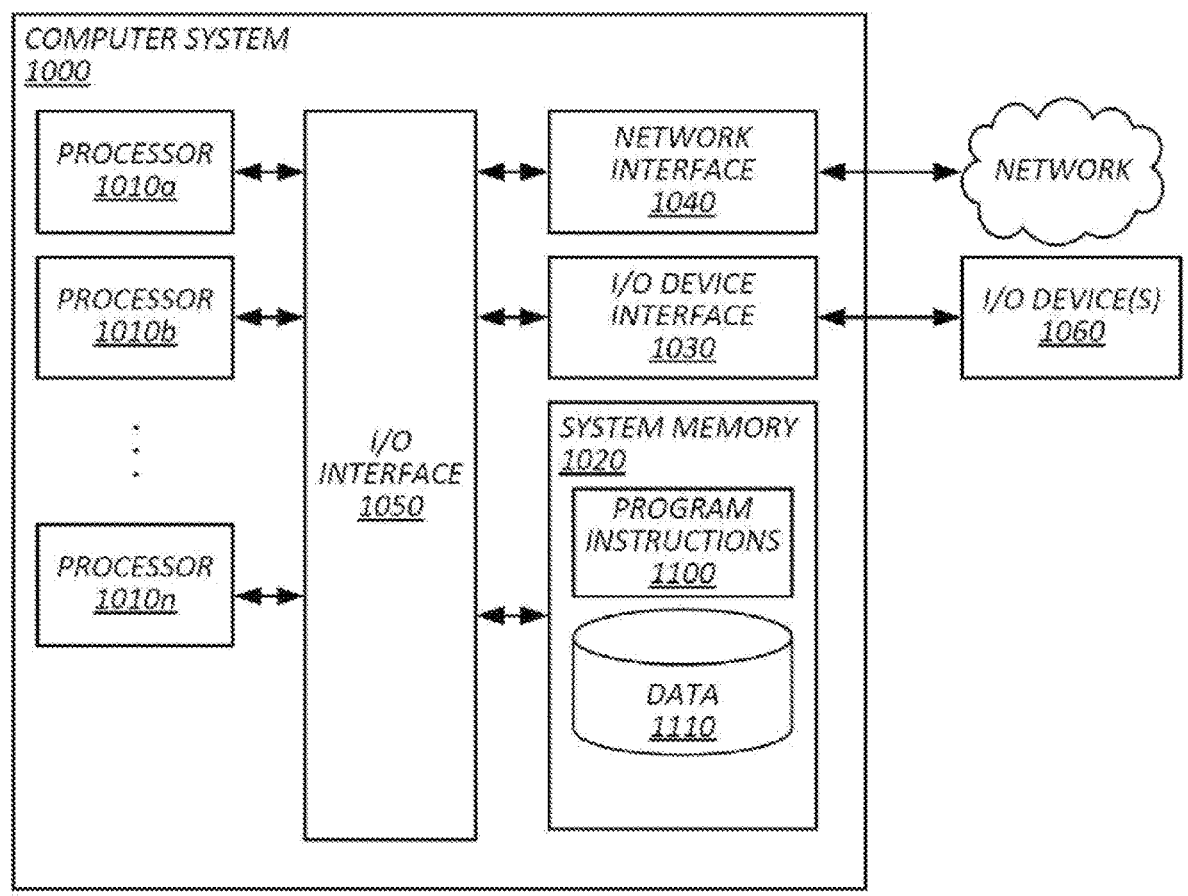
FIG. 4 shows an example of a computing device by which the above systems may be implemented.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A method of learning an audience member function, the method comprising:
    obtaining, with one or more processors, a training set of geographic data corresponding to a plurality of users, the training set of geographic data comprising a plurality of timestamped geolocations based on-geolocation histories of a plurality of mobile devices, each user associated with at least one mobile device and classified according to whether the respective user of the training set is a member of an audience;
    retrieving, with one or more processors, for each timestamped geolocation, a first attribute based on a geographic area indicated by the respective geolocation from among a plurality of other geographic areas and a second attribute based on a duration of time indicated by the respective timestamp from among a plurality of other durations of time;
    determining, with one or more processors, for each timestamped geolocation based on the respective attributes, at least one attribute score indicative of a propensity of users within the respective geographic area at the respective duration of time to exhibit a respective property, the at least one attribute score stored as training data for a respective user for which the timestamped geolocation corresponds;
    learning, by training on the training set, with one or more processors, feature functions of an audience member function configured to output a score indicative of a probability that a given user is a member of the audience, the feature functions being learned by:
        characterizing each user within the plurality of users by a respective vector comprising dimension information for at least some dimensions based on the respective attributes and the respective attribute scores for the respective user;
        calculating, for a first dimension, based on a first subset of vectors including dimension information for the first dimension, a value for the first dimension determined to reduce an amount of error of classifying the members of the audience having respective vectors in the subset as being not in the audience or another user not of the audience as being a member of the audience based on their respective dimension information;
        calculating, for another dimension, based on another subset of vectors including the dimension information for the first dimension and dimension information for the another dimension, a value for the another dimension determined to reduce an amount of error of classifying the members of the audience having respective vectors in the another subset as being not in the audience or another user not of the audience as being a member of the audience based on their respective dimension information;
        selecting, based in part on the amount of error in the first dimension and the amount of error in the another dimension, and respective amounts of error determined for a plurality of different calculations in other dimensions, at least the first dimension and the respective value and the another dimension and the respective value as features for at least one of the feature functions; and
        storing, with one or more processors, the feature functions of the audience member function in an audience repository; and
    classifying, with one or more processors, responsive to a score output by the audience member function based on a plurality of timestamped geolocations associated with a user of a mobile device, the user as being a member of, or not being a member of, the audience.

2. The method of claim 1, wherein classifying a user of a mobile device, the user as being a member of, or not being a member of, the audience comprises:
    receiving data describing a content request from the mobile device of the user at a given time at a given geographic location;
    retrieving the audience member function from the audience repository;
    determining audience membership of the user, at least in part, by inputting information corresponding to the mobile device, the given time, and the given geographic location into the audience membership function;
    in response to the determination of the user being in the audience, selecting content corresponding to the audience;
    causing the selected content to be sent to the mobile device of the user.

3. The method of claim 1, wherein:
the selecting further comprises selecting at least some of the other dimensions and their respective values as features of the at least one feature function or one or more other feature functions based on the respective amounts of error; and
the audience member function is a weighted combination of the feature functions.

4. The method of claim 1, wherein learning the feature functions comprises modeling a plurality of probabilities with an adaptive basis function, the adaptive basis function learning at least some model parameters and associated weights according to the training set.

5. The method of claim 1, wherein learning the feature functions further comprises, at least in part, performing steps comprising:
selecting the first subset corresponding to the first dimension based on a size of the first subset being larger than a threshold value;
calculating, for each of the plurality of other dimensions, and for each of a plurality of values of each of the plurality of other dimensions, the amount of error corresponding to the respective value in the respective other dimension;
selecting the another dimension and the value based on the amount of error of classifying the members of the audience by the another dimension and the value being less than in at least some of the other dimensions by their respective values.

6. The method of claim 5, wherein:
an amount of error is based on a measure of impurity corresponding to a division of vectors within a subset by at least one value for a given dimension.

7. The method of claim 5, wherein:
selecting the another subset corresponding to the another dimension further comprises selecting based on a size of the another subset being larger than a threshold value.

8. The method of claim 5, comprising:
before calculating an amount of error for a given value of a given dimension for a given subset of vectors:
determining both that at least some of the given subset of vectors is part of the audience and that at least some of the subset is not part of the audience.

9. The method of claim 1, wherein retrieving attributes for a timestamped geolocation comprises:
obtaining attributes of a geographic area;
augmenting records in a geographic information system by attributing the attributes of the geographic area to geographic locations in the geographic area based on population profiles in the geographic area for the respective geographic locations, and
wherein learning the feature functions comprises one or more determinations based on patterns in the augmented records corresponding to user geolocations.

10. The method of claim 1, further comprising:
determining divisions within a geographic area to quantize the geographic area into different geographic area units;
determining, for each geographic area unit, one or more attributes based at least in part on features or locations within the respective geographic area unit;
determining, for at least some geographic area units, one or more attributes based at least in part on a plurality of durations of time; and
storing information indicative of the geographic area units and their respective attributes.

11. The method of claim 10, wherein:
a given timestamped geolocation is mapped to a given one of the geographic area units within the geographic area and a given duration of time to retrieve attributes for the timestamped geolocation.

12. The method of claim 1, wherein:
geolocations of the timestamped geolocations in the training set are designated with records corresponding to different geographic areas;
at least some of the records have respective subsets of time-records corresponding to different durations of time; and
at least some timestamped geolocations in the training set are designed with time-records.

13. The method of claim 1, wherein calculating, for a first dimension, based on a first subset of vectors including dimension information for the first dimension, a value for the first dimension determined to reduce an amount of error of classifying the members of the audience having respective vectors in the subset as being not in the audience or another user not of the audience as being a member of the audience based on their respective dimension information comprises:
before the calculating, selecting the first dimension based on the first subset of vectors satisfying a threshold number of vectors; and
after the calculating, selecting the first dimension and the respective value for classifying users by the first dimension based on the amount of error satisfying a threshold amount error.

14. The method of claim 1, wherein:
calculating, for another dimension, based on another subset of vectors including the dimension information for the first dimension and dimension information for the another dimension, a value for the another dimension determined to reduce an amount of error of classifying the members of the audience having respective vectors in the another subset as being not in the audience or another user not of the audience as being a member of the audience based on their respective dimension information comprises:
before the calculating, selecting the another dimension based on the another subset of vectors satisfying a threshold number of vectors; and
after the calculating, selecting the another dimension and the respective value for classifying users by the another dimension based on the amount of error satisfying a threshold amount error.

15. The method of claim 1, further comprising:
calculating, for a third dimension, based on a third subset of vectors including the dimension information for the first dimension, the dimension information for the another dimension, and dimension information for the third dimension, a value for the third dimension determined to reduce an amount of error of classifying the members of the audience having respective vectors in the third subset as being not in the audience or another user not of the audience as being a member of the audience based on their respective dimension information.

16. The method of claim 1, wherein selecting, based in part on the amount of error in the first dimension and the amount of error in the another dimension, and respective amounts of error determined for a plurality of different calculations in other dimensions, at least the first dimension and the respective value and the another dimension and the respective value as features for at least one of the feature functions further comprises:

calculating, for a third dimension, based on a third subset of vectors including dimension information for the third dimension, a value for the third dimension determined to reduce an amount of error of classifying the members of the audience having respective vectors in the third subset as being not in the audience or another user not of the audience as being a member of the audience based on their respective dimension information;

calculating, for a fourth dimension, based on a fourth subset of vectors including the dimension information for the third dimension and dimension information for the fourth dimension, a value for the fourth dimension determined to reduce an amount of error of classifying the members of the audience having resp ective vectors in the fourth subset as being not in the audience or another user not of the audience as being a member of the audience based on their respective dimension information; and selecting, based in part on the amount of error in the third dimension and the amount of error in the fourth dimension, and respective amounts of error determined for a plurality of different calculations in other dimensions, the third dimension and the respective value and the fourth dimension and the respective value as features for at least one of the feature functions.

17. The method of claim 16, wherein:

the first dimension and the respective value and the another dimension and the respective value are selected as features of a first feature function based on at least the first dimension and the another dimension; and the third dimension and the respective value and the fourth dimensions and the respective value are selected as features of a second feature function based on at least the third dimension and the fourth dimension and not the first dimension.

18. The method of claim 17, wherein classifying, with one or more processors, responsive to a score output by the audience member function based on a plurality of timestamped geolocations associated with a user of a mobile device, the user as being a member of, or not being a member of, the audience comprises:

retrieving, with one or more processors, for each of the plurality of timestamped geolocations associated with the user, at least some attributes based on a geographic area indicated by respective geolocations and a duration of time indicated by respective timestamps for the respective geolocations;

determining, with one or more processors, attribute scores for the different ones of the at least some attributes for the user;

characterizing the user by a vector comprising dimension information for at least some dimensions based on the respective attributes and the respective attribute scores for the user, the at least some dimensions including the first dimension, the another dimension, the third dimension, and the fourth dimension; and wherein the score output by the audience member function is based on a weighting of component scores output by at least the first feature function and the second feature function.

19. The method of claim 1, wherein classifying, with one or more processors, responsive to a score output by the audience member function based on a plurality of timestamped geolocations associated with a user of a mobile device, the user as being a member of, or not being a member of, the audience comprises:

retrieving, with one or more processors, for each of the plurality of timestamped geolocations associated with the user, at least some attributes based on a geographic area indicated by respective geolocations and a duration of time indicated by respective timestamps for the respective geolocations;

determining, with one or more processors, attribute scores for the different ones of the at least some attributes for the user;

characterizing the user by a vector comprising dimension information for at least some dimensions based on the respective attributes and the respective attribute scores for the user, the at least some dimensions including the first dimension and the another dimension; and wherein the score output by the audience member function is based on the at least one of the feature functions being based on the first dimension and the respective value and the another dimension and the respective value.

20. A non-transitory computer-readable medium storing computer program instructions that when executed by one or more processors effectuate operations comprising:

obtaining a training set of geographic data corresponding to a plurality of users, the training set of geographic data comprising a plurality of timestamped geolocations based on geolocation histories of a plurality of mobile devices, each user associated with at least mobile device and classified according to whether the respective user of the training set is a member of an audience;

retrieving for each timestamped geolocation, a first attribute based on a geographic area indicated by the respective geolocation from among a plurality of other geographic areas and a second attribute based on a duration of time indicated by the respective timestamp from among a plurality of other durations of time;

determining for each timestamped geolocation based on the respective attributes, at least one attribute score indicative of a propensity of users within the respective geographic area at the respective duration of time to exhibit a respective property, the at least one attribute score stored as training data for a respective user for which the timestamped geolocation corresponds;

learning, by training on the training set, feature functions of an audience member function configured to output a score indicative of a probability that a given user is a member of the audience, the feature functions being learned by:

characterizing each user within the plurality of users by a respective vector comprising dimension information for at least some dimensions based on the respective attributes and the respective attribute scores for the respective user;

calculating, for a first dimension, based on a first subset of vectors including dimension information for the first dimension, a value for the first dimension determined to reduce an amount of error of classifying the members of the audience having respective vectors in the subset as being not in the audience or another user not of the audience as being a member of the audience based on their respective dimension information;

calculating, for another dimension, based on another subset of vectors including the dimension information for the first dimension and dimension information for the another dimension, a value for the another dimension determined to reduce an amount of error of classifying the members of the audience having respective vectors in the another subset as being not in the audience or another user not of the audience as being a member of the audience based on their respective dimension information;

selecting, based in part on the amount of error in the first dimension and the amount of error in the another dimension, and respective amounts of error determined for a plurality of different calculations in other dimensions, at least the first dimension and the respective value and the another dimension and the respective value as features for at least one of the feature functions; and storing the feature functions of the audience member function in an audience repository; and classifying responsive to a score output by the audience member function based on a plurality of timestamped geolocations associated with a user of a mobile device, the user as being a member of, or not being a member of, the audience.

\* \* \* \* \*